(12) United States Patent
Fuller

(10) Patent No.: US 6,505,805 B2
(45) Date of Patent: Jan. 14, 2003

(54) VEHICLE SEAT SLIDE

(75) Inventor: Jeffrey P. Fuller, White Lake, MI (US)

(73) Assignee: Faurecia Automotive Seating Canada Limited, Mississauga (CA)

( * ) Notice: Subject to any disclaimer, the term of this patent is extended or adjusted under 35 U.S.C. 154(b) by 0 days.

(21) Appl. No.: 09/873,434

(22) Filed: Jun. 5, 2001

(65) Prior Publication Data

US 2002/0179798 A1 Dec. 5, 2002

(51) Int. Cl.[7] ............................................... F16M 13/00
(52) U.S. Cl. ...................................................... 248/429
(58) Field of Search ................................ 248/429, 424; 297/378.1, 378.12, 378.14, 341

(56) References Cited

U.S. PATENT DOCUMENTS

| | | | | |
|---|---|---|---|---|
| 5,100,092 A | * | 3/1992 | Sovis | 248/429 |
| 5,597,206 A | * | 1/1997 | Ainsworth et al. | 297/378.12 |
| 5,927,809 A | * | 7/1999 | Tame | 297/341 |
| 6,086,154 A | * | 7/2000 | Mathey et al. | 297/341 |
| 6,152,533 A | * | 11/2000 | Smuk | 297/341 |
| 6,231,123 B1 | * | 5/2001 | Tame | 297/378.1 |

* cited by examiner

Primary Examiner—Ramon O. Ramirez
(74) Attorney, Agent, or Firm—Patrick J. Hofbauer

(57) ABSTRACT

A vehicle seat slide comprises a movable track member slidably engaging a fixed track member for sliding movement between rearward and forward track positions. A track lock is mounted on the movable track member to selectively restrain the movable track member relative to the fixed track member at an intermediate track position. An actuator is provided for operative connection with the track lock for movement between an actuating configuration whereat the actuator urges the track lock away from a locking configuration and a rest configuration whereat the actuator permits the track lock to move into the locking configuration. A controller is provided for contact with the actuator, so as to cause the actuator to be held in the actuating configuration upon the movable track member being moved to the forward track position and for thereafter permitting the actuator to return to the rest configuration only after movement of the movable track member to a position rearward of the intermediate track position.

19 Claims, 14 Drawing Sheets

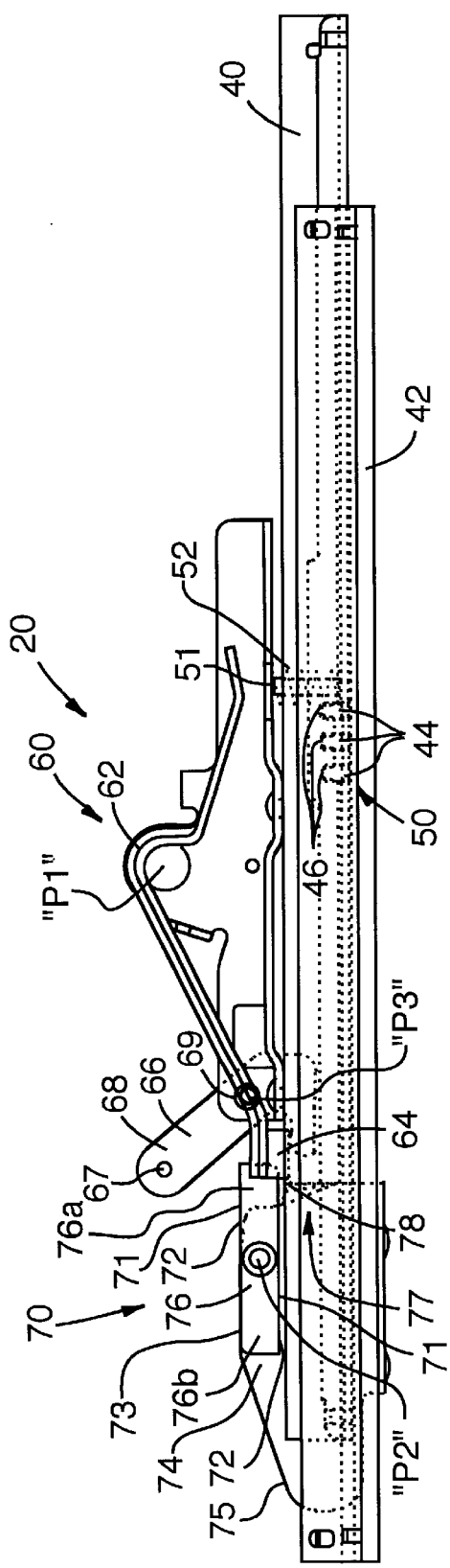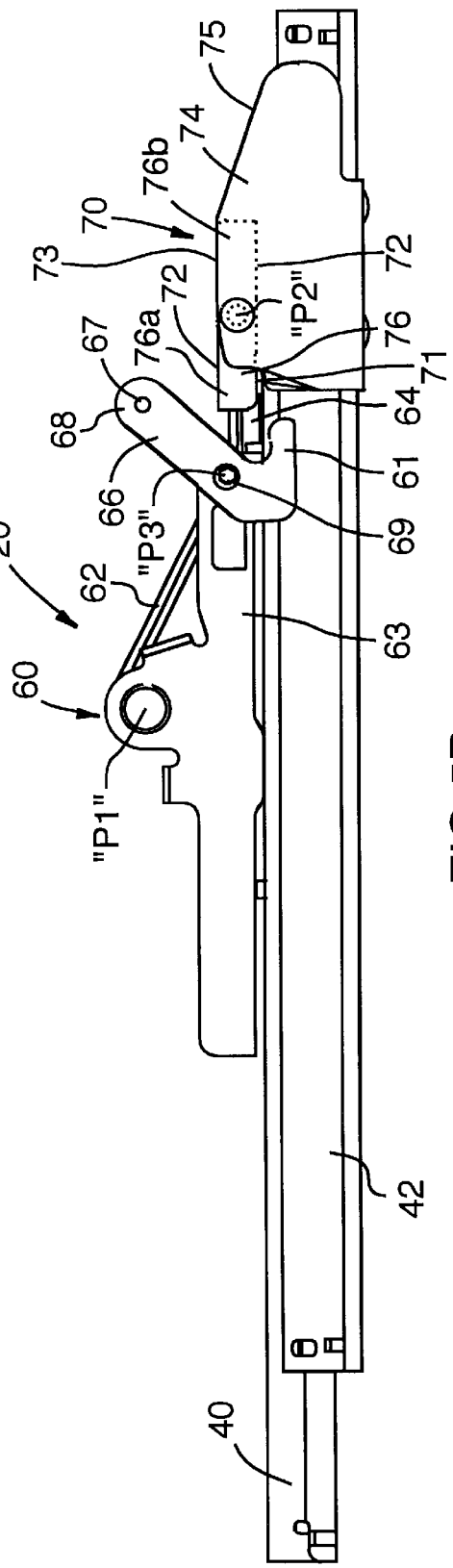
FIG.5A
FIG.5B

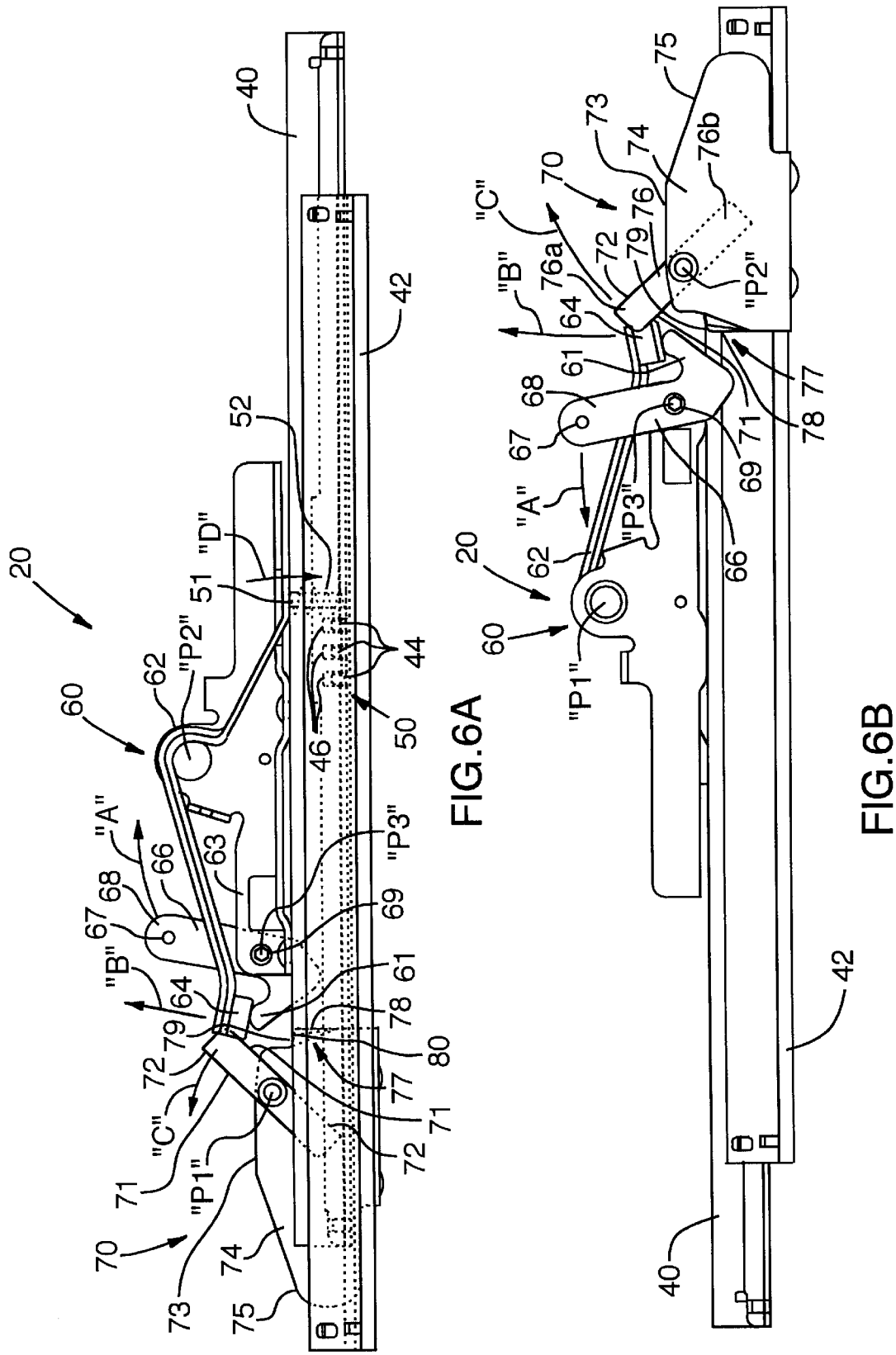

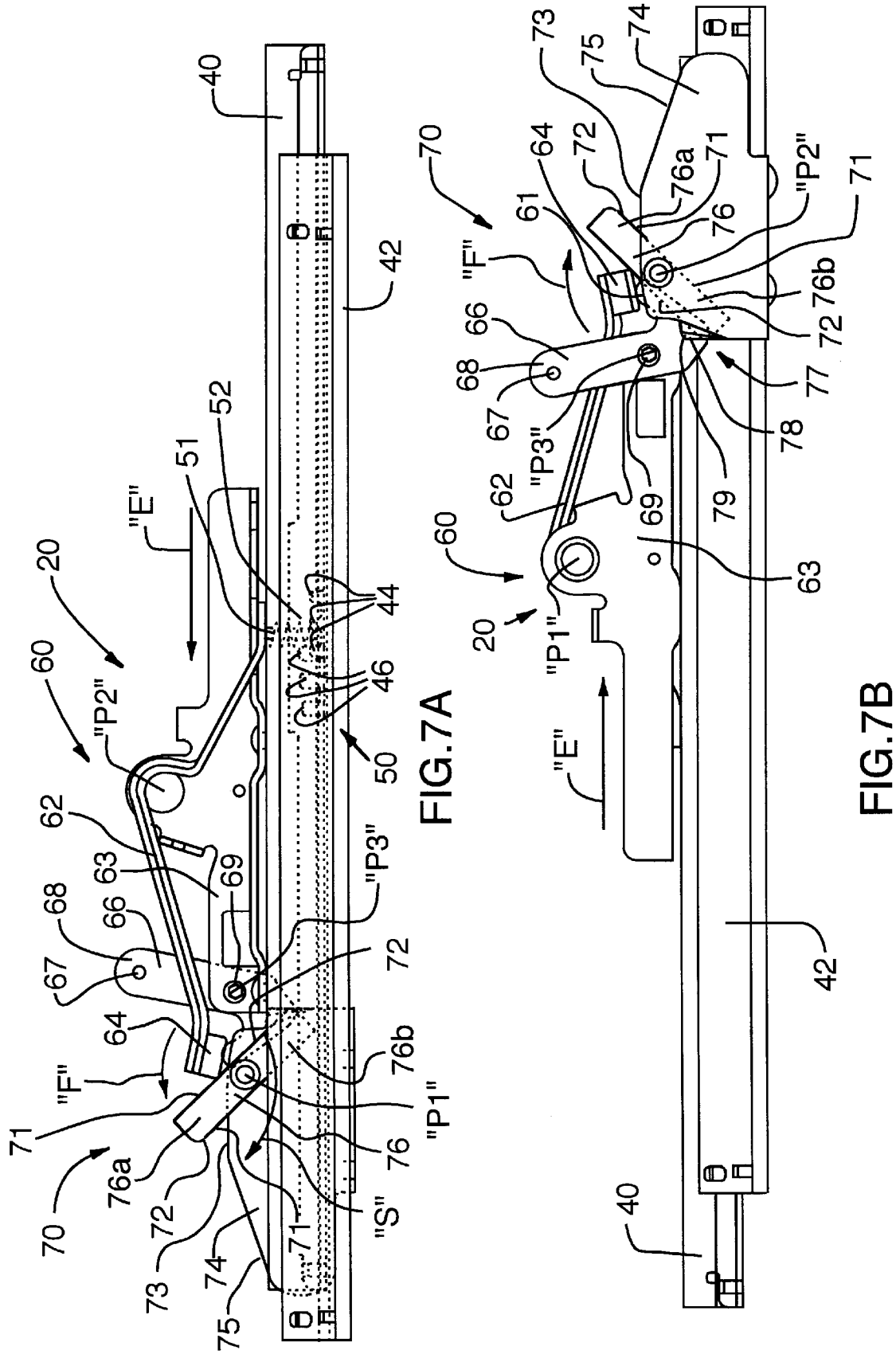

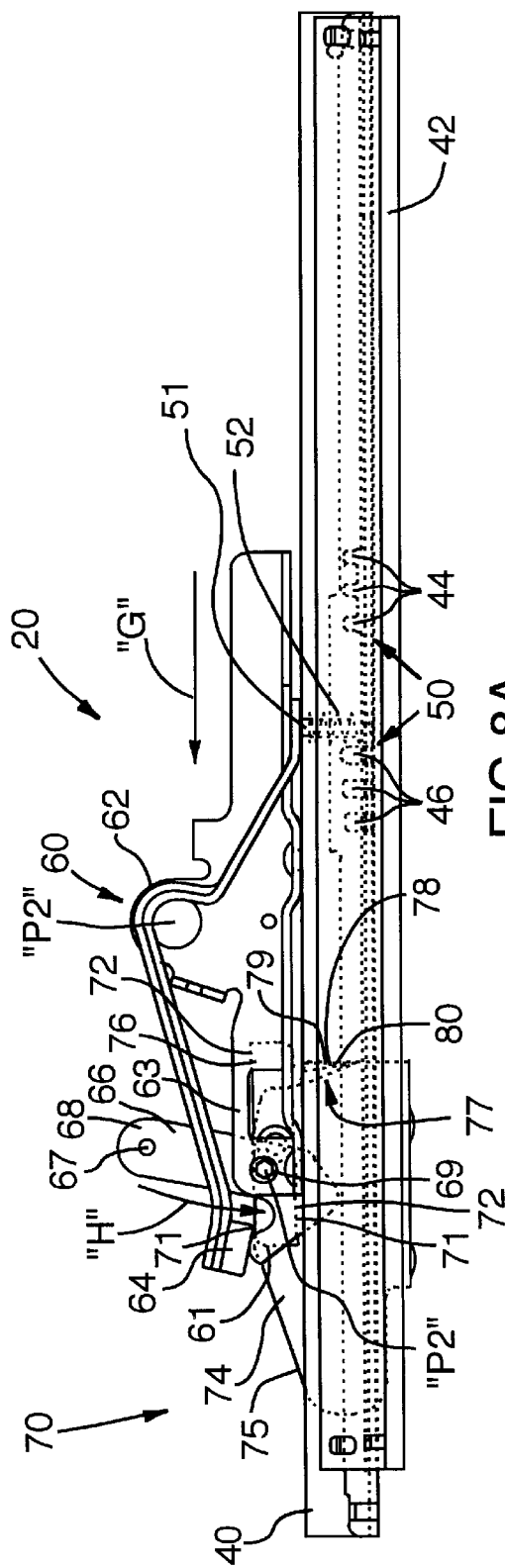
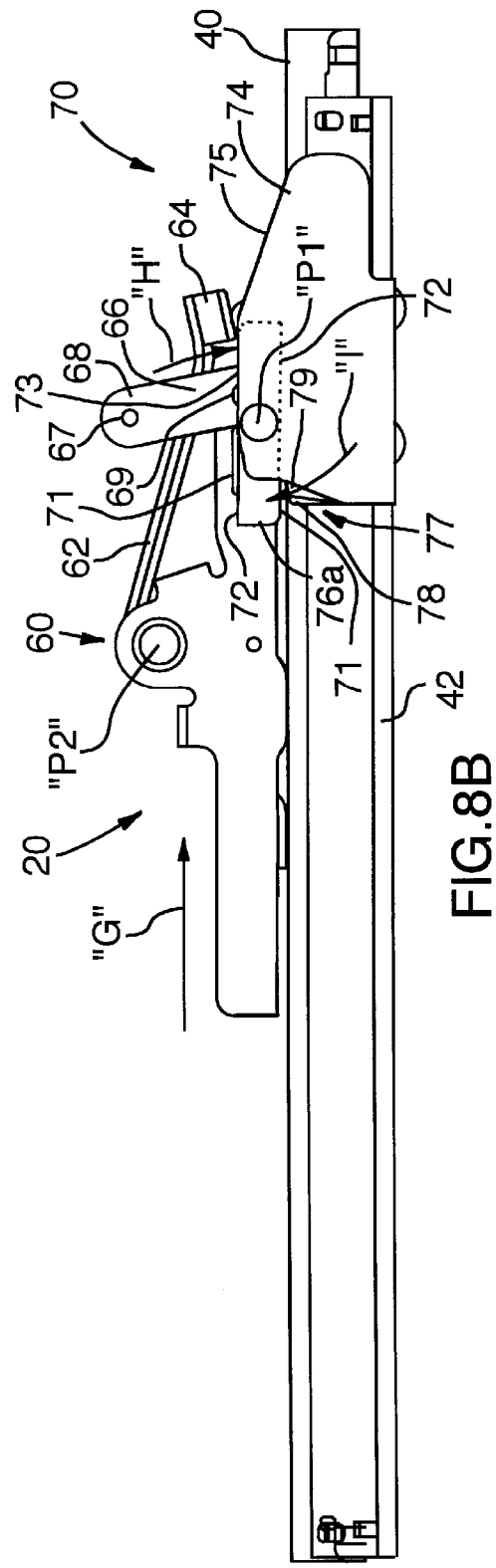
FIG.8A
FIG.8B

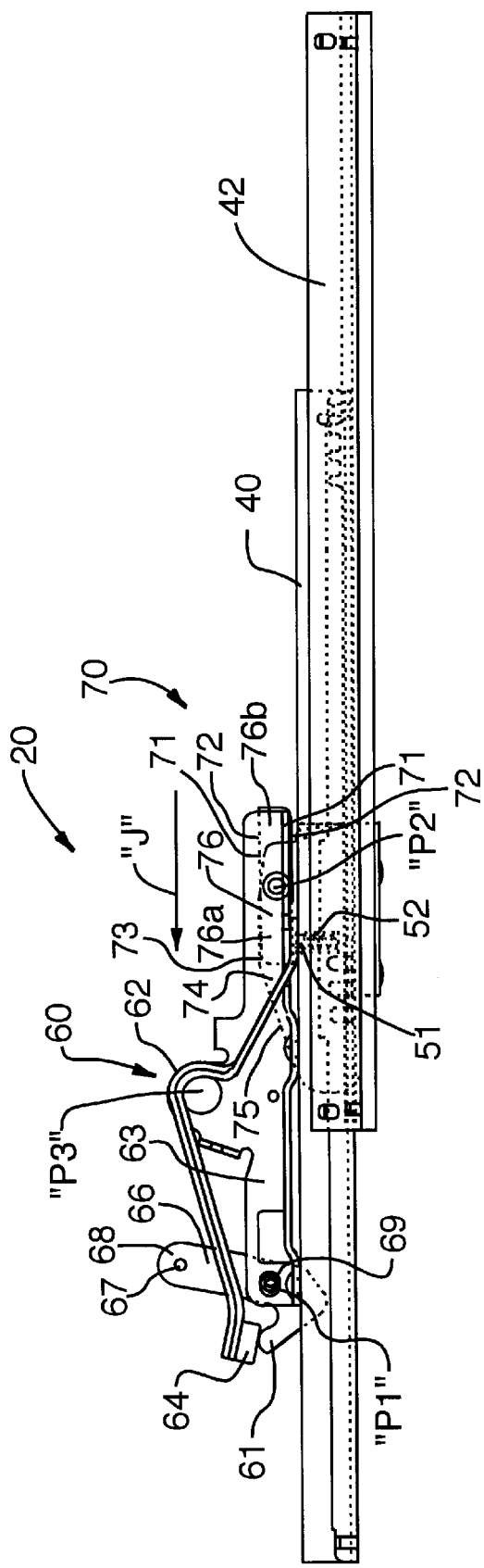
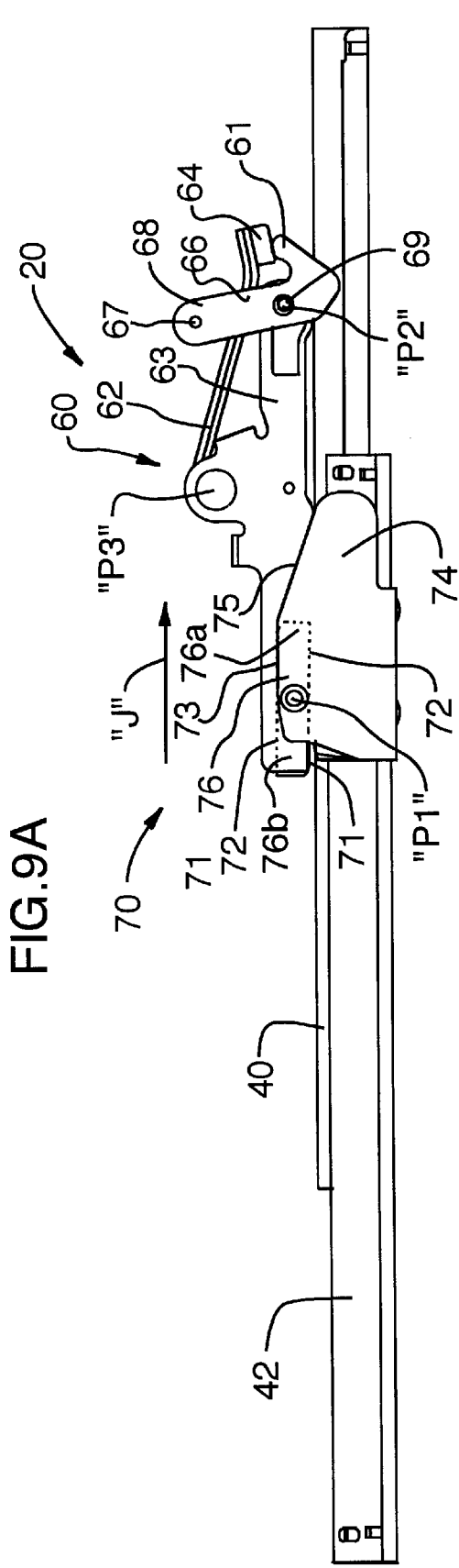
FIG.9A
FIG.9B

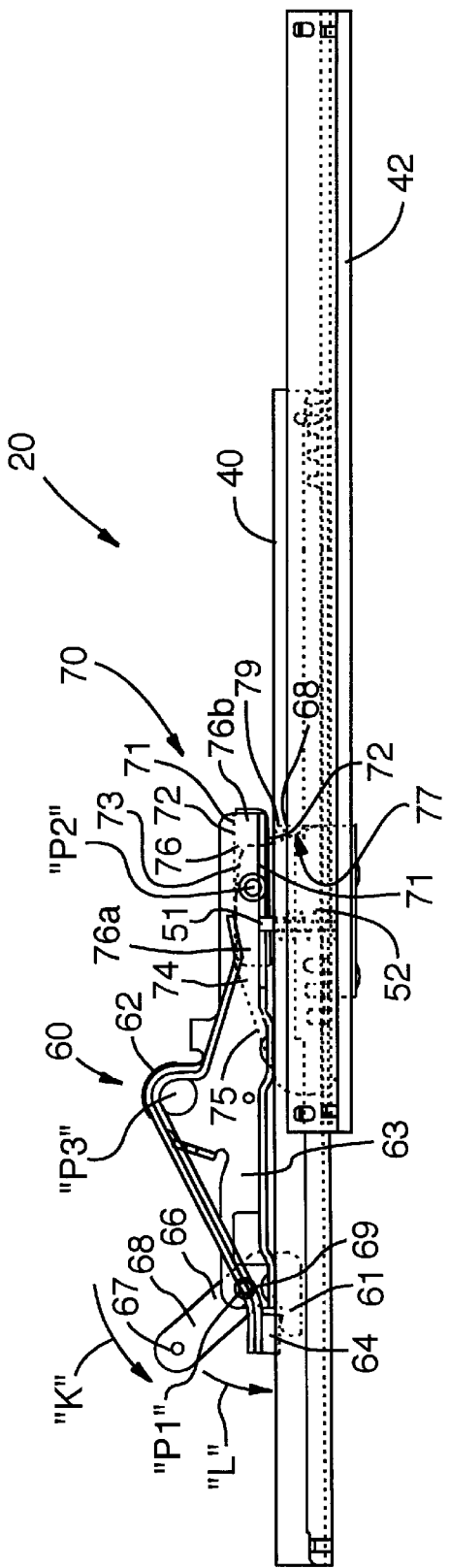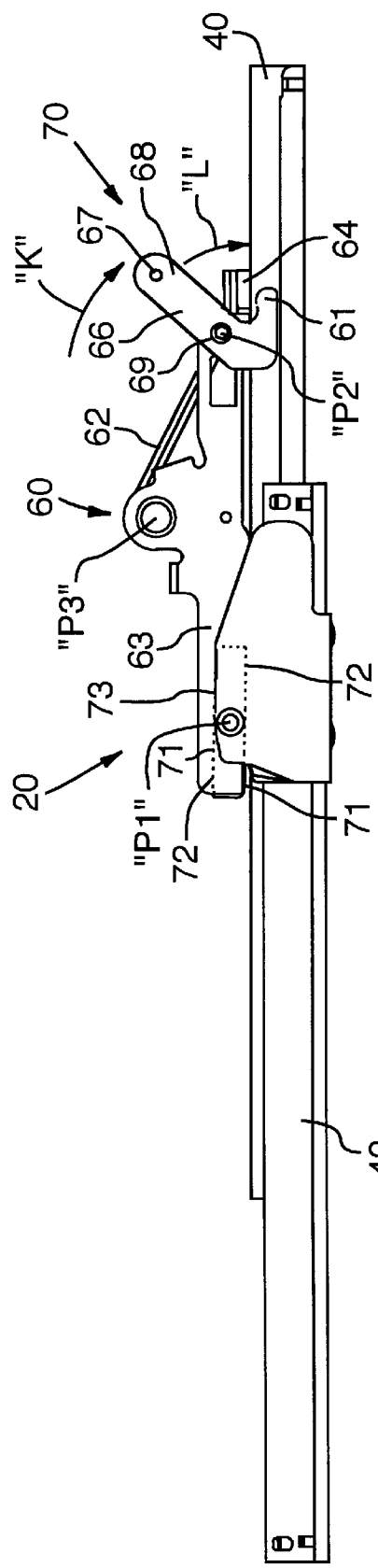
FIG.10A
FIG.10B

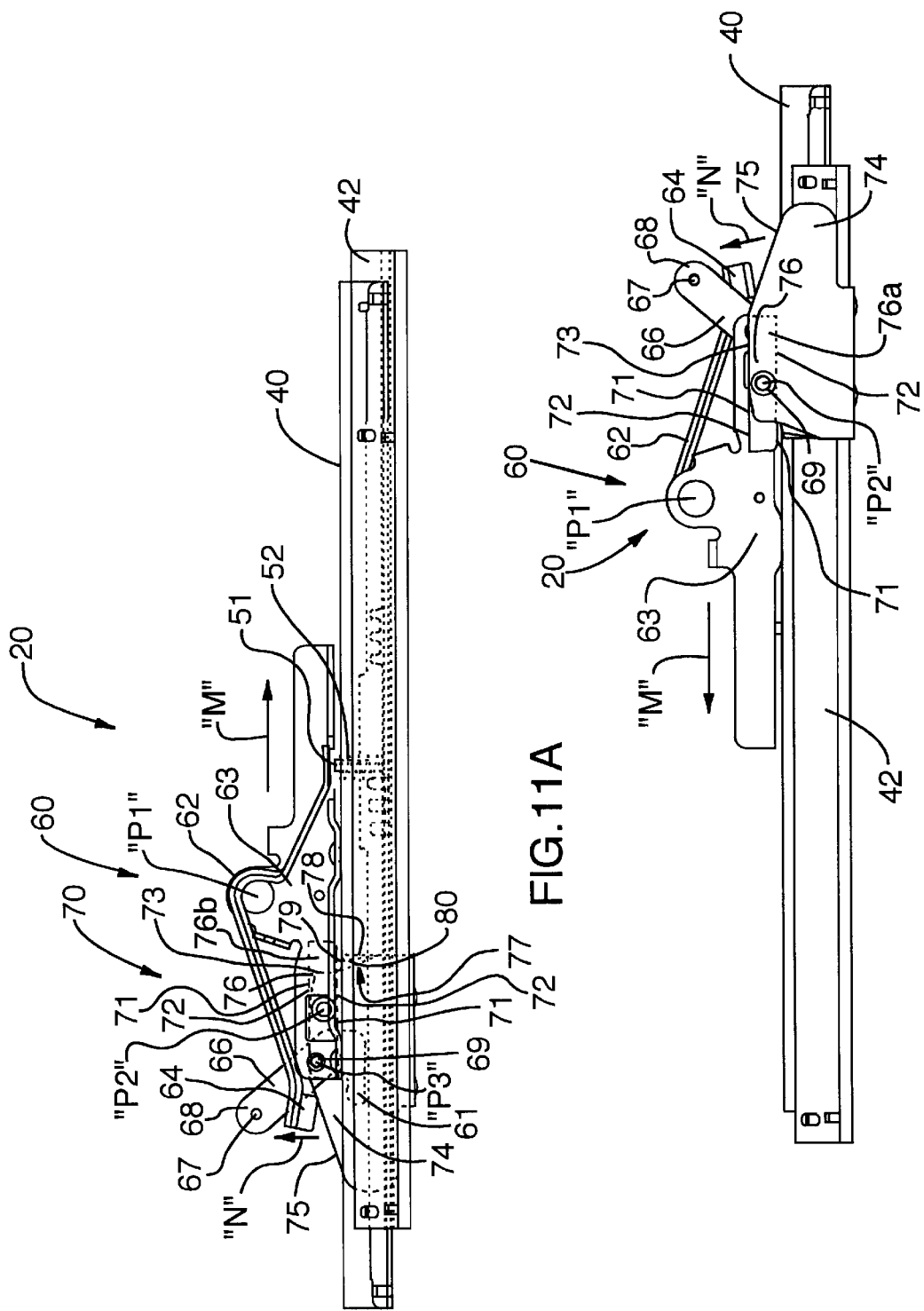

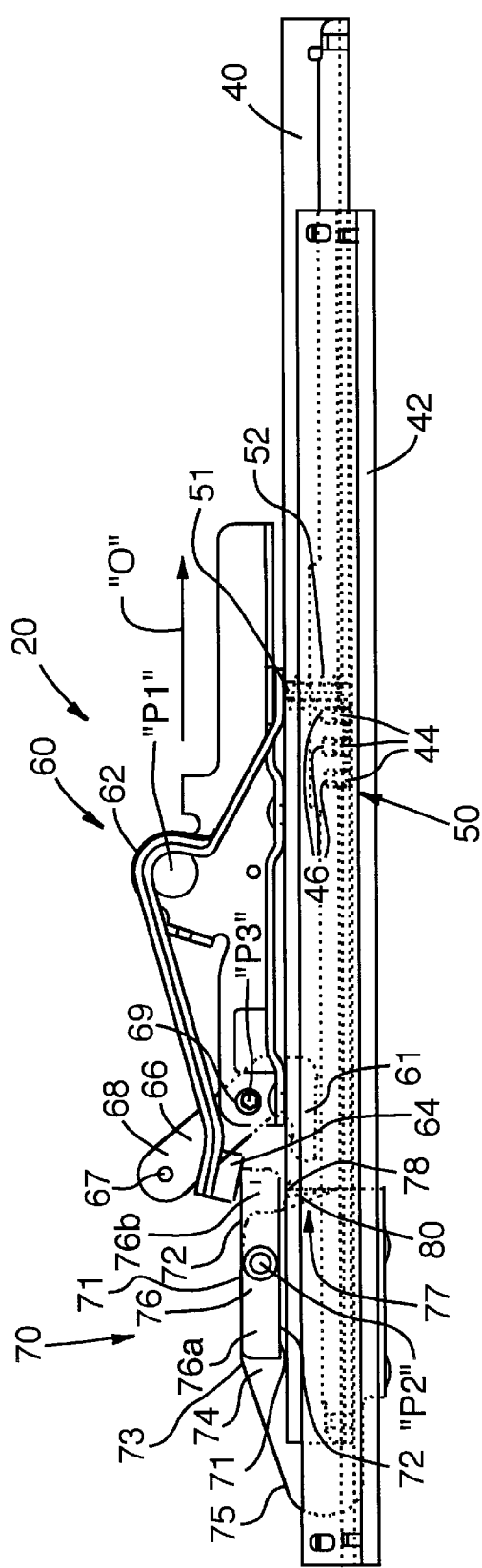
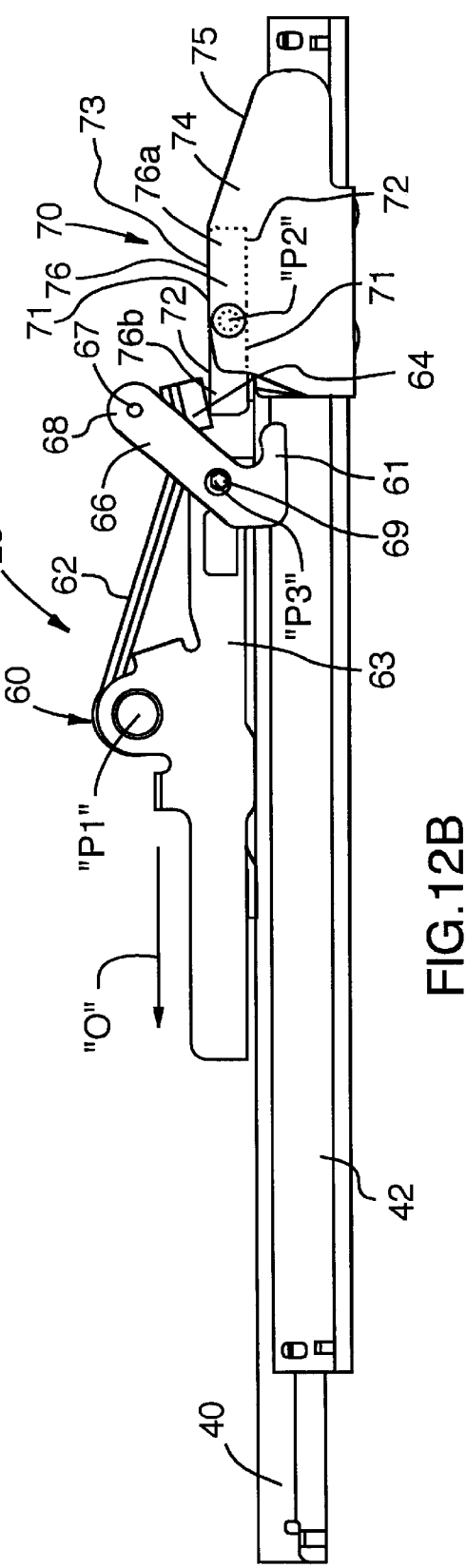
FIG.12A
FIG.12B

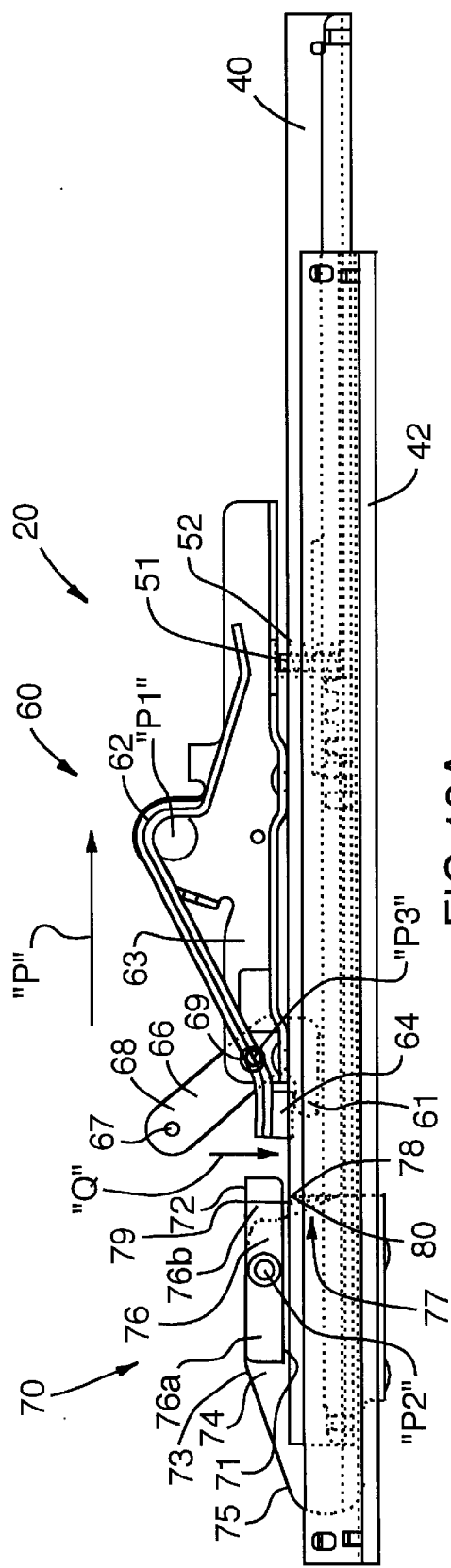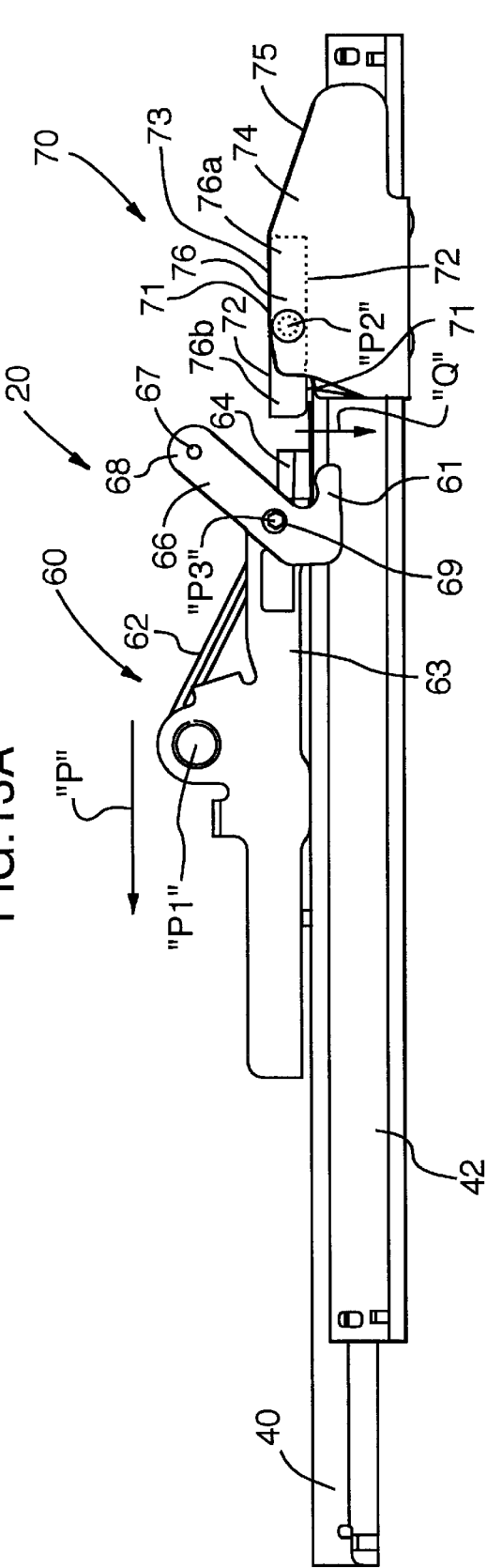
FIG.13A
FIG.13B

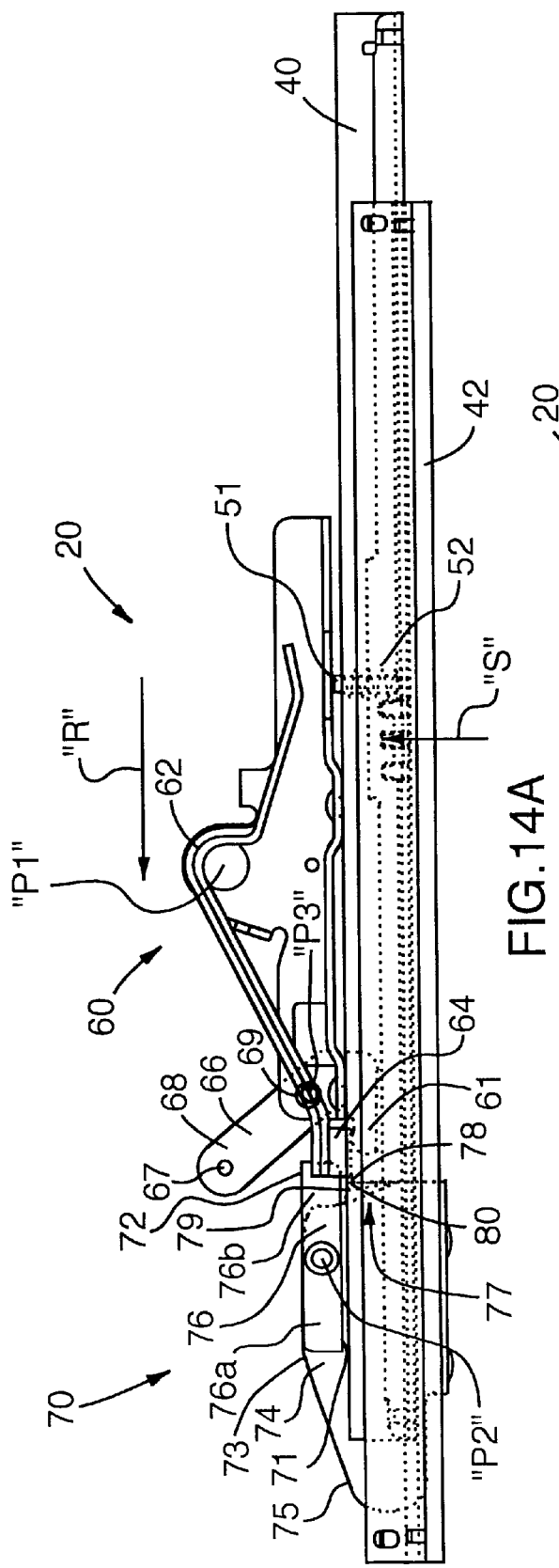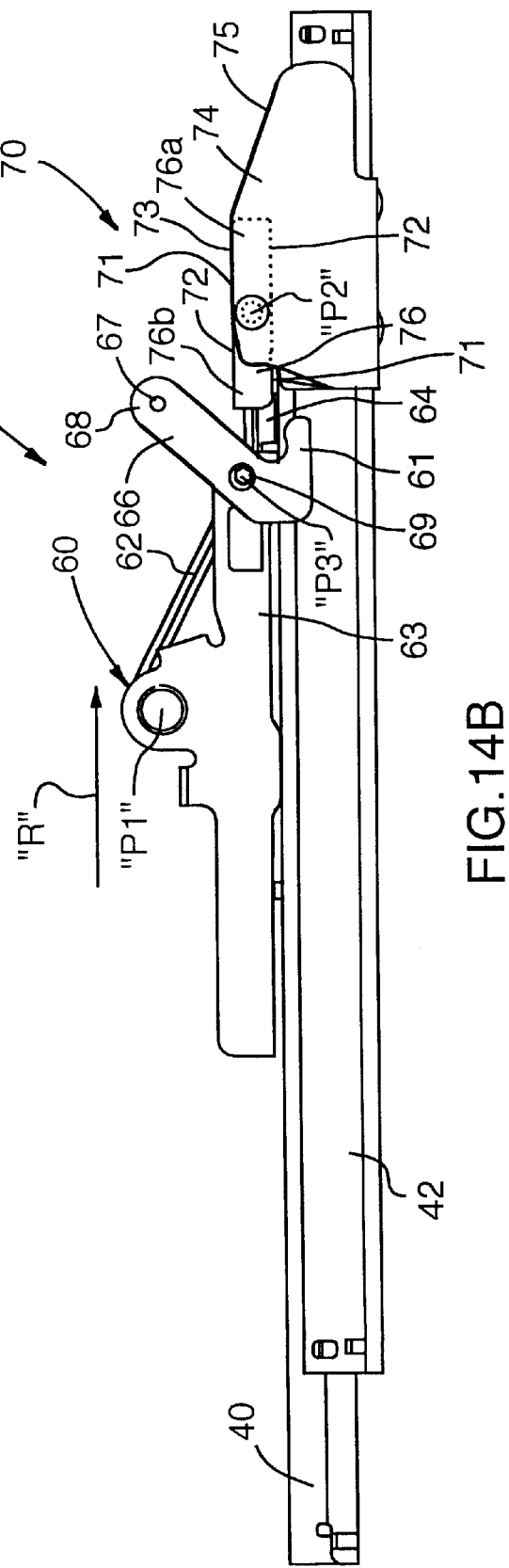
FIG. 14A
FIG. 14B

VEHICLE SEAT SLIDE

FIELD OF THE INVENTION

The present invention relates to vehicle seat slides for use in vehicle seat assemblies, and more particularly to such seat slides having a single track lock-up position.

BACKGROUND OF THE INVENTION

Multi-seat vehicles, such as vans, minivans, sport utility vehicles, and the like, typically have middle (second row) and perhaps rear (third row) vehicles seats that are placed rearwardly of the driver's and front passenger's (first row) vehicle seats. In some such vehicles, there is not direct access by means of an adjacent door to the third row seats or the cargo area behind the second row seats, or to the second row seats in vehicles having only one door on each side. In this instance, many vehicles have an "easy entry" (sometimes referred to in the art as an "E-Z" entry) feature, wherein the track slides of the first row vehicle seat assembly or the second row vehicle seat assembly, as is the case, are unlocked and the seat assembly is moved longitudinally forwardly from an occupiable position located aft of the track lock-up position to an unlocked access position located fore of the track lock-up position, as the seatback member is forwardly folded over the seat cushion member.

To achieve this unlocked access position in the prior art, the seatback latch is released and the seatback member is thereafter folded forwardly over the seat cushion member. Further, both the inboard and outboard movable track members of the vehicle seat slide are automatically unlocked, with respect to their fixed track member, and are caused to slide forwardly along their respective fixed track members by a biasing spring, until the vehicle seat assembly reaches a forwardly displaced, unlocked vehicle access position. When use of the seat assembly is again required, the backrest of the vehicle seat assembly is returned to its generally upright configuration, and the seat assembly is slid rearwardly to the vicinity of its starting position, whereat the inboard and outboard and movable track members again lock-up with their respective fixed track members to secure the seat assembly in place within the vehicle.

In order to return the prior art vehicle seat assembly rearwardly to the track lock-up position as aforesaid, it is common to push on the outboard portion of the backrest of the vehicle seat assembly, since the outboard portion is within easy reach of a person outside the vehicle. Accordingly, the outboard movable track member tends to become disposed slightly rearwardly relative to the inboard side movable track member, largely due to the stacking of tolerances in the vehicle seat slide and related track lock mechanism. In this instance, there is a significant chance that the outboard movable track member of the vehicle seat slide will lock first, and the inboard movable track member will not quite reach its lock-up position, and thus will remain unlocked. Such single sided locking of the vehicle seat slide is quite dangerous in any situation where rapid deceleration is involved, such as an accident situation, as there is a chance that the vehicle seat assembly could break loose from such single sided locking and slide forwardly in an unconstrained manner.

The above-noted safety concern is not as critical in a prior art vehicle seat slide that can be locked in any one of a plurality of seat slide lock-up positions, as there is a locking redundancy, such that there is a chance that the vehicle seat slide could lock in any one of a more forward or a more rearward locking position so as to prevent unexpected release of the track lock mechanism assembly. However, in prior art vehicle seat slides having a single track lock-up position, there is no chance of a seat slide locking in such a more forward or rearward locking position, as no redundant lock-up positions exist. Therefore, it is especially important in vehicle seat slides having a single track lock-up position (such as, for example, a vehicle seat slide incorporating an easy entry feature) that the inboard and outboard movable track members must both lock whenever the vehicle seat assembly is slid rearwardly past the track lock-up position.

In order to ensure the locking of both the inboard and outboard movable track members at the track lock-up position, it has been found useful to slide the vehicle seat assembly evenly, and not in a longitudinally uneven skewed manner, thus precluding one movable track member from reaching the track lock-up position before the other movable track member.

Another reason that both the inboard and the outboard track lock mechanisms might not lock upon return of the vehicle seat assembly from a forward easy entry position to its track lock-up position, is the stacking of tolerances of the various components of the movable and fixed track members and of the track lock mechanisms. Such tolerances, or in the other words the variation in the size of the components of the movable and fixed track members and the track lock mechanisms, can cause the inboard and outboard track lock mechanisms to be longitudinally misaligned when the vehicle seat assembly is being returned to its design position, thus making concurrent locking of both of the track lock mechanisms difficult.

Therefore, it is an object of the present invention to provide for use with a vehicle seat assembly, a seat slide that ensures that both the inboard and outboard movable track members of the seat assembly are locked in place upon return of the vehicle seat assembly from a forwardly displaced unlocked access position to a rearwardly displaced track lock-up position.

It is a further object of the present invention to provide a vehicle seat slide having a single track lock-up position for use in a vehicle seat assembly having an easy entry feature, wherein the vehicle seat slide precludes single sided locking of the inboard and outboard movable track members upon return of the vehicle seat assembly from the forwardly displaced unlocked access position to the rearwardly displaced track lock-up position.

It is another object of the present invention to provide a vehicle seat slide having a single track lock-up position for use in a vehicle seat assembly having an easy entry feature, which vehicle seat slide minimizes the effect of the stacking of tolerances on the locking of both the inboard and the outboard movable track members upon reaching their respective track lock-up positions.

SUMMARY OF THE INVENTION

In accordance with the present invention there is disclosed a vehicle seat slide for use with a vehicle seat assembly mounted thereon. The vehicle seat slide comprises a movable track member slidably engaging a fixed track member for longitudinal sliding movement of the movable track member relative to the fixed track member along a longitudinal axis between a rearward track position, an intermediate track position, and a forward track position. A track locking means is mounted on one of the fixed and movable track members and has one or more detent portions selectively engageable with a corresponding number of slots formed on the other of the fixed and movable track members to respectively receive, in blocking engagement, one each, the one or more detent portions in generally transverse relation to the longitudinal axis, so as to define a locking configuration of the track locking means, at which locking configuration the longitudinal sliding movement of the movable track member relative to the fixed track member is restrained. The track locking means further comprising a biasing means adapted to bias the track locking means toward the locking configuration. An actuator means is mounted on the movable track member in operative connection with the track locking means for movement between an actuating configuration whereat the actuator means urges the track locking means away from the locking configuration against the action of the biasing means, and a rest configuration whereat the actuator means permits the track locking means to move toward the locking configuration. A control means is operatively mounted on the fixed track member for co-operative contact of the control means and the actuator means so as to cause the actuator means to be held in the actuating configuration upon the movable track member being moved to the forward track position and for thereafter permitting the actuator means to return to the rest configuration only after movement of the movable track member to a position rearward of the intermediate track position.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the vehicle seat slide according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings:

FIG. 5A is a right side elevational view of the preferred embodiment vehicle seat slide illustrated in FIG. 2, with the movable track member locked in an intermediate design position by the track lock mechanism;

FIG. 5B is a left side elevational view of the preferred embodiment vehicle seat slide illustrated in FIG. 5A;

FIG. 6A is a side elevational view similar to FIG. 5A, but with the track lock mechanism unlocked;

FIG. 6B is a left side elevational view of the preferred embodiment vehicle seat slide illustrated in FIG. 6A;

FIG. 7A is a side elevational view similar to FIG. 6, but with the movable track member having moved slightly forwardly from the position of FIG. 6;

FIG. 7B is a left side elevational view of the preferred embodiment vehicle seat slide illustrated in FIG. 7A;

FIG. 8A is a side elevational view similar to FIG. 7A, but with the movable track member having moved even more forwardly from the position of FIG. 7A;

FIG. 8B is a left side elevational view of the preferred embodiment vehicle seat slide illustrated in FIG. 8A;

FIG. 9A is a side elevational view similar to FIG. 8A, but with the movable track member having moved fully forwardly to a forward track position;

FIG. 9B is a left side elevational view of the preferred embodiment vehicle seat slide illustrated in FIG. 9A;

FIG. 10A is a side elevational view similar to FIG. 9A, but with the lever mechanism that operates the track lock mechanism released, but with the track lock mechanism remaining unlocked;

FIG. 10B is a left side elevational view of the preferred embodiment vehicle seat slide illustrated in FIG. 10A;

FIG. 11A is a side elevational view similar to FIG. 10A, but with track lock mechanism in an unlocked configuration and with the movable track member located between the forward position and the design position and moving rearwardly toward the design position;

FIG. 11B is a left side elevational view of the preferred embodiment vehicle seat slide illustrated in FIG. 11A;

FIG. 12A is a side elevational view similar to FIG. 11A, but with track lock mechanism in an unlocked configuration and with the movable track member located at the design position and moving rearwardly therepast;

FIG. 12B is a left side elevational view of the preferred embodiment vehicle seat slide illustrated in FIG. 12A;

FIG. 13A is a side elevational view similar to FIG. 12A, but with track lock mechanism in an unlocked configuration and with the movable track member having moved rearwardly past the design position to a fully rearward position;

FIG. 13B is a left side elevational view of the preferred embodiment vehicle seat slide illustrated in FIG. 13A;

FIG. 14A is a side elevational view similar to FIG. 13A, with the movable track member having returned to the design position and with track lock mechanism having just moved to its locked configuration; and, FIG. 14B is a left side elevational view of the preferred embodiment vehicle seat slide illustrated in FIG. 14A.

DETAILED DESCRIPTION OF A PREFERRED EMBODIMENT

Figure 1:
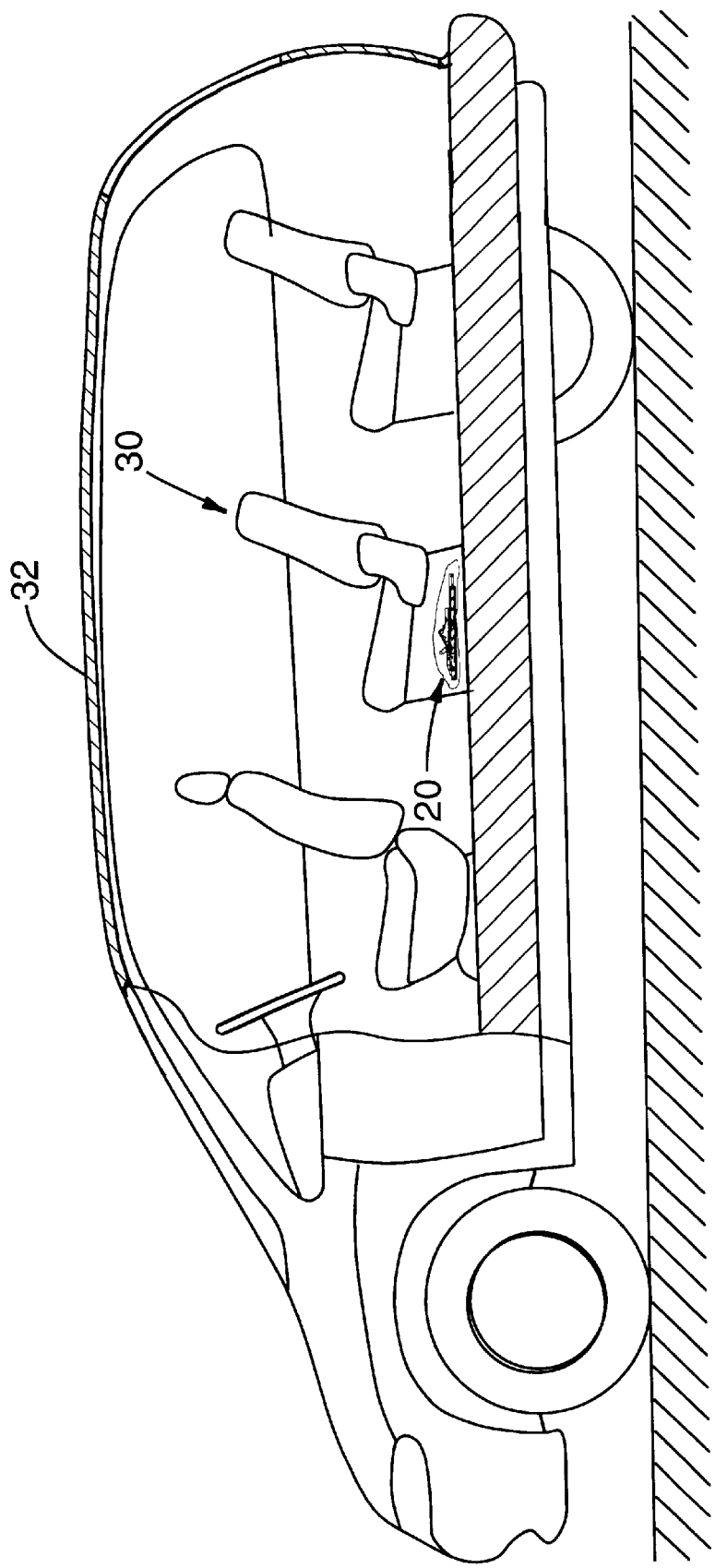
FIG. 1 is a side elevational view of a preferred embodiment vehicle seat slide according to the present invention, installed in a vehicle in a passenger seat in the second row position, with a rear portion of the vehicle longitudinally sectioned for the sake of clarity.
Figure 2:
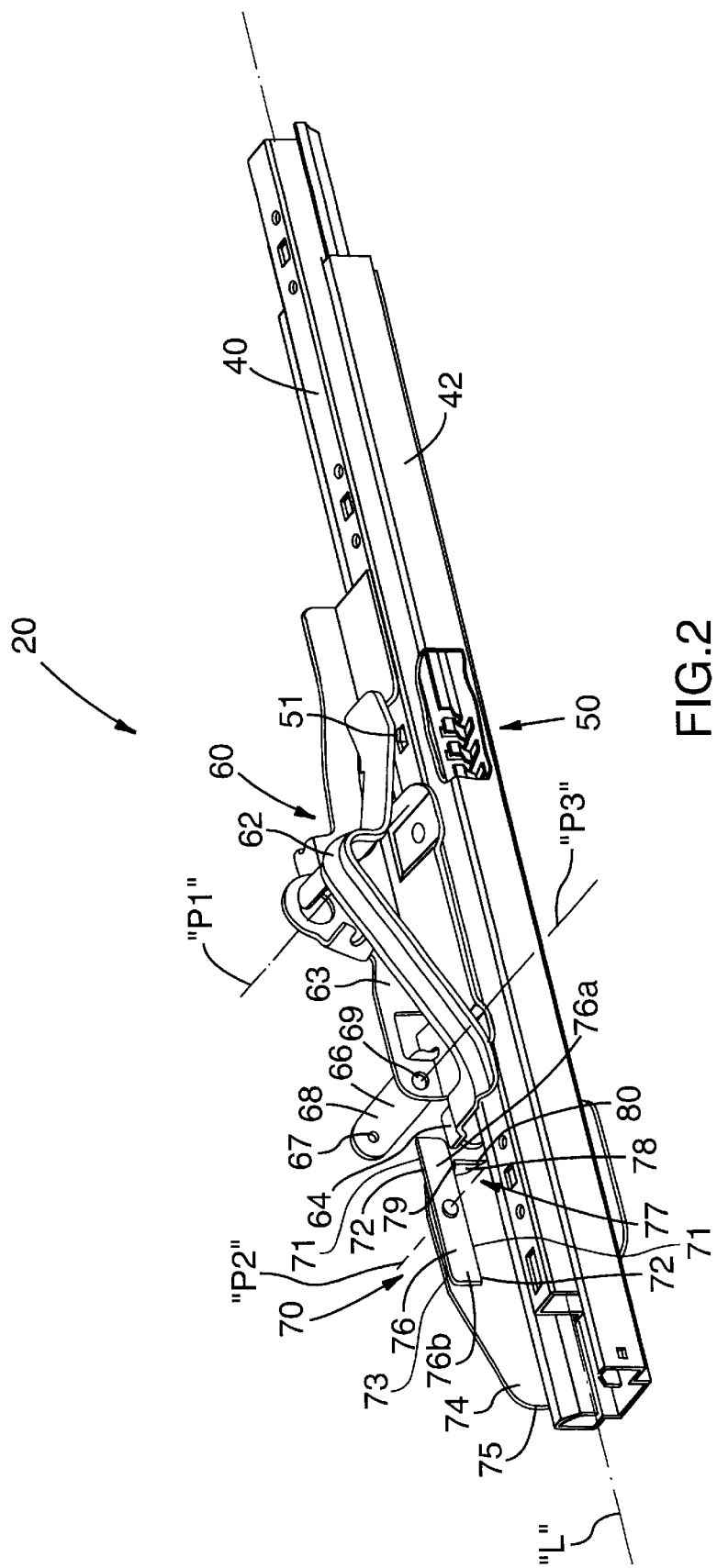
FIG. 2 is a perspective view of the preferred embodiment vehicle seat slide illustrated in FIG. 1, viewed from the front right.
Figure 3:
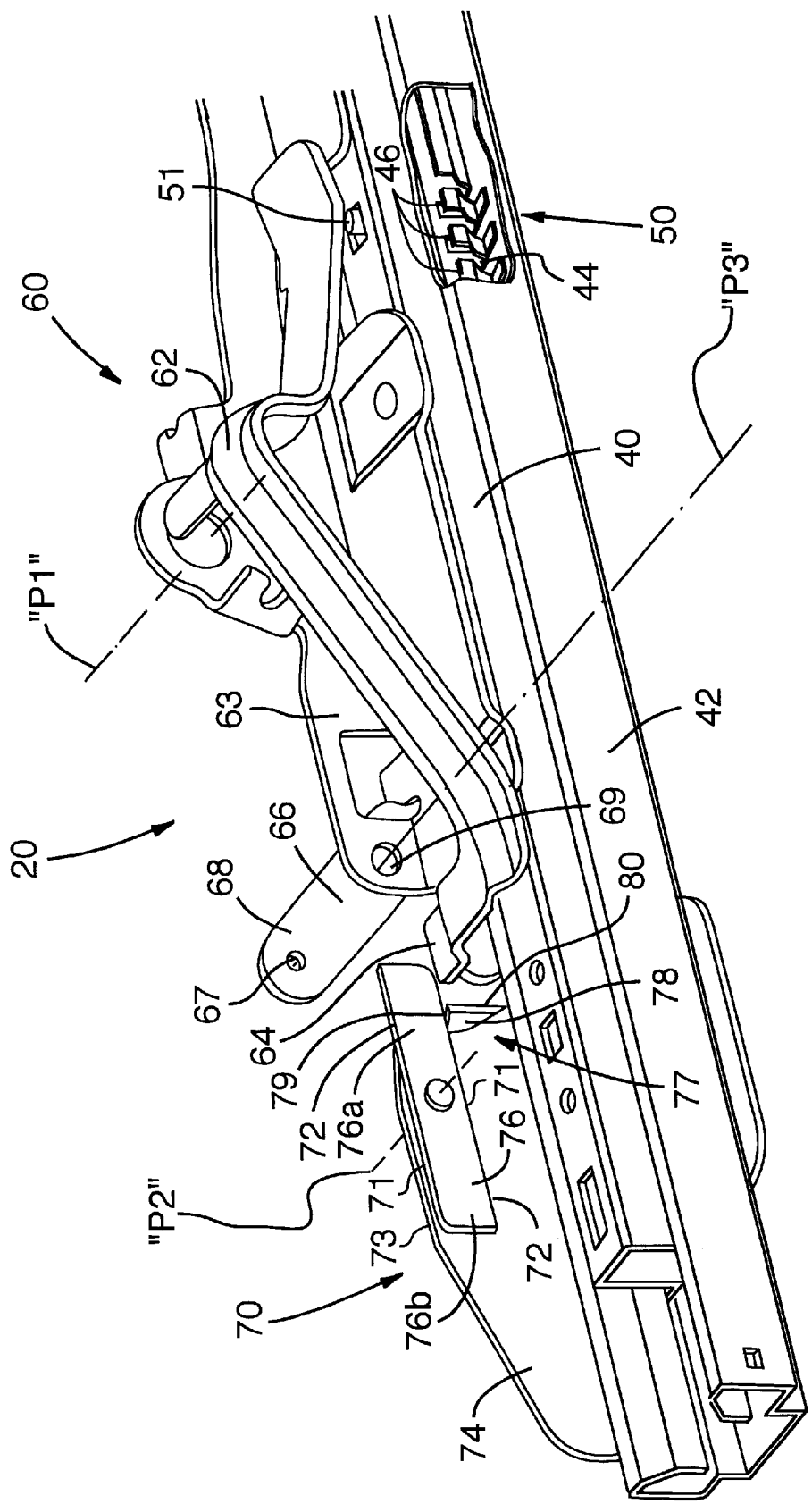
FIG. 3 is an enlarged perspective view of a forward portion of the preferred embodiment vehicle seat slide illustrated in FIG. 2.
Figure 4:
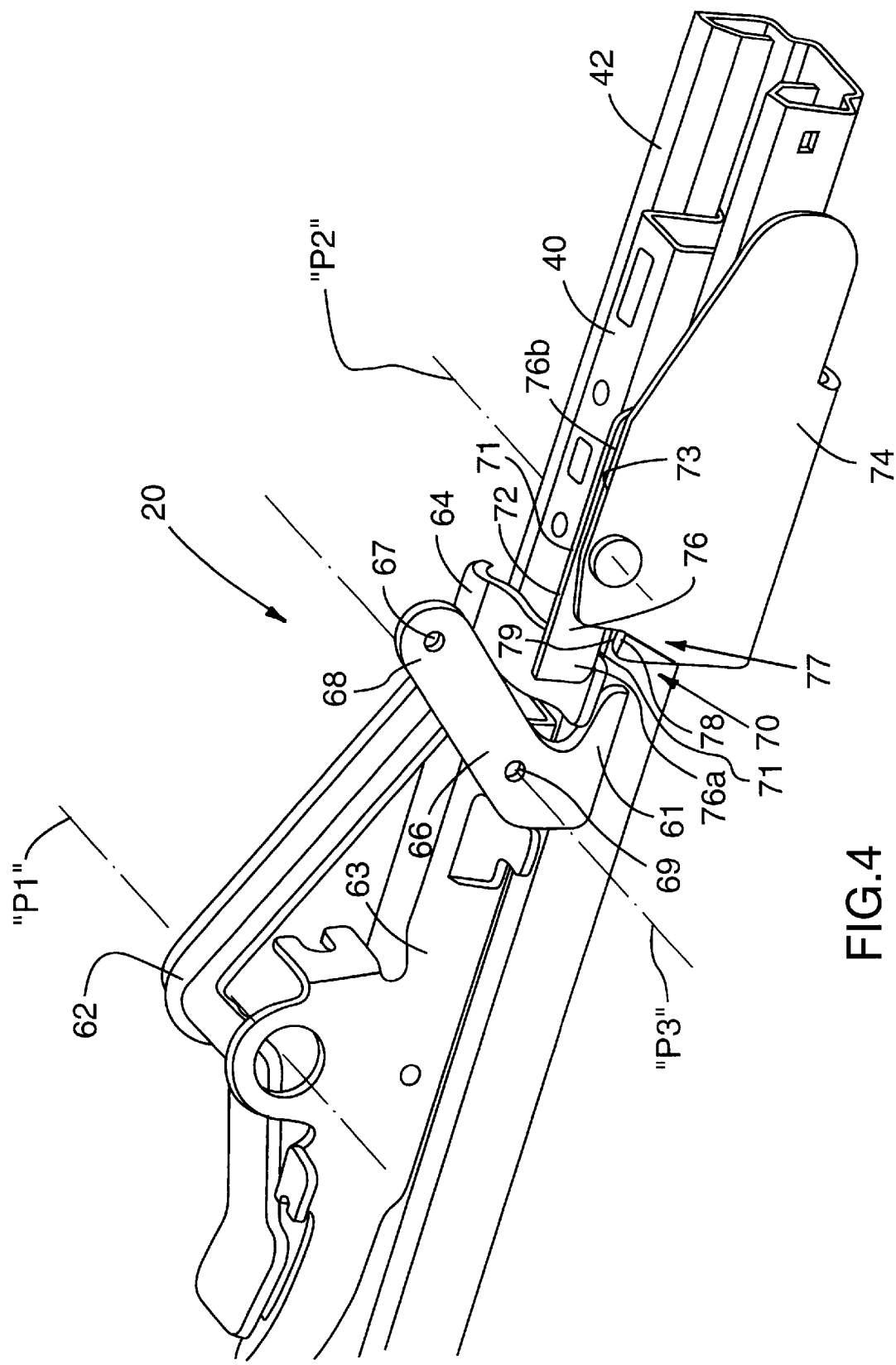
FIG. 4 is an enlarged perspective view of the forward portion of the preferred embodiment vehicle seat slide illustrated in FIG. 3, but viewed from the front left.

Reference will now be made to FIGS. 1 through 14B which show the preferred embodiment vehicle seat slide, as indicated by the general reference numeral 20, according to the present invention, for use with a vehicle seat assembly, as indicated by the general reference numeral 30, in a vehicle 32, as is best seen in FIG. 1.

The vehicle seat slide 20 comprises a moveable track member 40 that slidably engages a fixed track member 42 for longitudinal sliding movement of the moveable track member 40 relative to the fixed track member 42 along a longitudinal axis "L" (See FIG. 2) between a rearward track position, as can be best seen in FIGS. 13A and 13B, an intermediate track position as can be best seen in FIGS. 2, 5A, 5B, 6A, 6B, 12A, 12B, 14A and 14B, and a forward track position as can be best seen in FIGS. 9A, 9B, 10A and 10B. The intermediate track position corresponds to the single track lock-up position of the vehicle seat assembly.

A conventional track locking means 50 is mounted on one of the fixed track member 42 and the moveable track member 40. In the preferred embodiment illustrated, the track locking means 50 is mounted on the moveable track member 40 so as to move longitudinally therewith along the fixed track member 42. The track lock means 50 has one or more detent portions 44 selectively engageable with a corresponding number of slots 46 formed on the fixed track member 42. The slots 46 respectively receive, in blocking engagement, the one or more detent portions 44 in generally transverse relation to the longitudinal axis "L", so as to define a locking configuration of the track locking means 50. At the locking configuration, the longitudinal sliding movement of the moveable track member 40 relative to the fixed track member 42 in restrained. Alternatively, the track lock means 50 could be mounted on the fixed track member 42. In this case, the slots 46 would be formed in the movable track member 46.

The locking means 50 further comprises a biasing means 52, as can be best seen in FIGS. 5A and 6A, which biasing means 52 comprises a spring member 52 adapted to bias the track locking means 50 towards its locking configuration.

An actuator means, as indicated by the general reference numeral 60, is mounted on the moveable track member 40 in operative connection with the track locking means 50. In the preferred embodiment illustrated, the actuator means comprises a longitudinally aligned primary crank member 62 mounted on the moveable track member 40 by means of a carriage 63 for pivotal motion about a first pivot axis "Pi" oriented substantially transversely to the longitudinal axis "L". The longitudinally aligned primary crank member 62 is pivotally mounted for movement between an actuating configuration, as is best seen in FIGS. 6A through 9B and 12A through 12B, and a rest configuration, as is best seen in FIGS. 2 through 5B and 13A through 14B, by means of manual operation of a handle (not shown). In the actuating configuration, the longitudinally aligned primary crank member 62 urges the track locking means 50 away from the locking configuration against the actuation of the spring member 52. In the rest configuration, the longitudinally aligned primary crank member 62 permits the track locking means 50 to move toward the locking configuration.

The handle is operatively interconnected to a lever member 66 via a sheathed Bowden type cable (not shown) connected to aperture 67 in the upper arm 68 of the lever member 66. The lever member 66 is pivotally mounted on the carriage 63 by pin member 69 for rotation above pivot axis "P$_3$". Accordingly, pulling on the cable rotates the lever member about pivot axis "P$_3$" to lift a lower finger portion 61, which contacts a cam follower portion 64 of the primary crank member 62 thus rotating the primary crank member 62 from its actuating configuration to its rest configuration.

A control means, as indicated by the general reference numeral 70, is operatively mounted on the fixed track member 42 for co-operative contact of the control means 70 and the actuator means. In the preferred embodiment illustrated, the control means comprises a base member 74 securely affixed to the fixed track member 42 and a rotatable cam member 76 pivotally mounted on the base member 74 for rotational movement about a substantially horizontally disposed second pivot axis "P$_2$". The second pivot axis "P$_2$" is preferably substantially parallel to the first pivot axis "P$_1$" and the second pivot axis "P$_2$" is also oriented substantially transversely to the longitudinal axis "L".

The base member 74 and the rotatable cam member 76 together present a cam surface 72, so as to provide for the co-operative contact of the actuator means 60 and the control means 70, as described more fully below. The cam surface 72 is disposed along the top edge 73 of the base member 74 and also along each elongate edge 71 of the rotatable cam member 76. It should be noted that each elongate edge 71 of the rotatable cam member 76 becomes aligned with the top edge 73 of the base member 74 under certain conditions, as will be seen below.

The rotatable cam member 76 comprises an elongate arm member pivotally mounted substantially symmetrically about the second pivot axis "P$_2$", so that one half 76a and the other half 76b of the elongate arm member are substantially equivalent one half to the other. In this manner, the rotatable cam member 76 will not be gravity biased to a pre-disposed position, and also each half 76a,76b of the rotatable cam member 76 can be used equivalently.

The base member 74 has a forwardly facing ramp surface 75 leading to the cam surface 72. The forwardly facing ramp surface 75 is disposed to receive the cam follower portion 64 of the primary crank member 62 in rearwardly directed sliding engagement, when the moveable track member 40 starts to move from its forward track position, as shown in FIGS. 9A and 9B, towards its intermediate track position, as is shown in FIGS. 11A and 11B.

The rotatable cam member 76 is pivotally mounted on the base member 74 for the aforesaid rotational movement about the second pivot axis "P$_2$" between an actuator passing orientation and an actuator bearing orientation. In the preferred embodiment illustrated, the actuator passing orientation is close to a vertical orientation, as can be best seen in FIGS. 6A and 6B, and the actuator bearing orientation is a substantially horizontal orientation, as can be best seen in FIGS. 12A and 12B.

The rotational movement of the rotatable cam member 76 is permitted in a first rotational direction only, indicated by arrow "F" in FIGS. 7A and 7B, and is precluded in an opposite second rotational direction indicated by arrow "S" (indicated in FIGS. 7A and 7B) by a ratchet means, as indicated by general reference numeral 77, mounted on the base member 74. The rotational movement of the rotatable cam member 76 is precluded in the opposite second rotational direction "S" by the ratchet means 77 only when the rotatable cam member 76 is in the substantially horizontal orientation. In the preferred embodiment illustrated, the ratchet means 77 comprises a laterally projecting stop flange member 78 disposed at the rear end of the base member 74 and integrally formed therewith. The laterally projecting stop flange member 78 has a stop surface 79 for precluding the rotatable cam member 76 from pivoting about the second pivot axis "P$_2$" in the second rotational direction "S", and an inclined surface 80 adjacent the stop surface 79 for permitting the rotatable cam member 76 to advance up the inclined surface 80 past the stop surface 79 in the first rotational direction "F". Any other suitable one-way ratchet means can be substituted for the ratchet means 77 shown.

In the actuator passing orientation, the actuator means 60 is permitted to move from its rest configuration, as shown in FIGS. 5A and 5B, to its actuating configuration, as indicated by arrow "B" in FIGS. 6A and 6B, when the actuator means 60 is in its intermediate track position. In the actuator bearing orientation, the actuator means 60 is caused to be held in its actuating configuration by the base member 74, as can be best seen in FIGS. 7A, 7B, 8A and 8B, upon the moveable track member 40 being moved towards its forward track position, as can be best seen in FIGS. 9A, 9B, 10A and 10B, and thereafter permitted to return to its rest configuration only after movement of the moveable track member 40 to a position rearward of its intermediate track position, as can be best seen in FIGS. 13A and 13B.

The cam follower portion 64 contacts the base member 74 when the actuator means 60 is in its actuating configuration, so as to preclude forward movement of the moveable track member 40 from its intermediate track position, as can be best seen in FIGS. 5A and 5B, towards its forward track position as can be best seen in FIGS. 9A, 9B, 10A and 10B.

The rotatable cam member 76 is disposed vertically over the cam follower portion 64 of the primary crank member 62, as can be best seen in FIGS. 5A and 5B, when the moveable track member 40 is disposed in its intermediate track position and the rotatable cam member 76 is disposed in its actuator bearing orientation.

The cam follower portion 64 of the primary crank member 62 engages the cam surface 72 of the control means in sliding relation when the moveable track member 40 moves rearwardly from its forward track position, as can be best seen in FIGS. 9A, 9B, 10A and 10B, through its intermediate track position, as can be best seen in FIGS. 12A, and 12B, and to its rearward track position, as can be best seen in FIGS. 13A and 13B, when the actuator means 60 is in its actuating configuration.

Reference will now be made to FIGS. 5A through 14B to explain the vehicle seat slide 20 of the present invention in use. As can be seen in FIGS. 5A and 5B, the longitudinally aligned primary crank member 62 is in its rest configuration and the track locking means 50 is in its locking configuration. As can be seen in FIGS. 6A and 6B, the longitudinally aligned primary crank member 62 has been urged from its rest configuration to its actuating configuration, as indicated by arrow "B", by means of the lever member 66. The lever member 66 has been itself rotated, as indicated by arrow "A" by means of the sheathed cable (not shown) that is attached to the manual manipulation handle (also not shown). In turn, the cam follower portion 64 of the longitudinally aligned primary crank member 62 has contacted the rotatable cam member 76 and caused it to rotate from its actuator bearing orientation to its actuator passing orientation, as indicated by arrow "C". Also, the longitudinally aligned primary crank member 62 presses on the pushbutton 51 against the bias of the spring member 52, so as to release the track locking means 50.

As can be seen in FIGS. 7A and 7B, the movable track member 40 has undergone longitudinal sliding movement relative to the fixed track member 42 along the longitudinal axis "L", as indicated by arrow "E", from the intermediate track position shown in FIGS. 6A and 6B. Correspondingly, the cam follower portion 64 of the longitudinally aligned primary crank member 62 has continued to rotate the rotatable cam member 76, as indicated by arrow "F".

As can be seen in FIGS. 8A and 8B, the movable track member 40 thereafter continues longitudinal sliding movement relative to the fixed track member 42, as indicated by arrow "G", and the longitudinally aligned primary crank member 62 is released and the cam follower portion 64 correspondingly lowered, as indicated by arrow "H", into contact with the cam surface 72 of the base member 74. In this manner, the longitudinally aligned primary crank member 62 is held in its actuating configuration upon the movable track member 40 being moved to its forward track position. The cam follower portion 64 of the longitudinally aligned primary crank member 62 slides parallel to the cam surface 75 of the base member 74 so as to assist in rotation of the rotatable cam member 76 in the direction of arrow "I" in FIG. 8B.

As can be seen in FIGS. 9A and 9B, the movable track member 40 has moved fully forwardly to a forward track position corresponding to an easy entry position of the vehicle seat assembly 30, as indicated by arrow "J", at which position the cam follower portion 64 is clear of the base member 74.

As can be seen in FIGS. 10A and 10B, the cam follower portion 64 of the longitudinally aligned primary crank member 62 is no longer supported by the cam surface 72 of the base member 74 and the cam follower portion 64 has lowered further, as indicated by arrow "L". Correspondingly, the lever member 66 has rotated, as indicated by arrow "L", to its original position shown in FIG. 5.

As can be seen in FIGS. 11A and 11B, the movable track member 40 has started longitudinal sliding movement relative to the fixed track member 42, in a rearward direction, as indicated by arrow "M", from its forward track position. Such rearward movement would typically be caused by manual return of the vehicle seat assembly 30 to its upright occupiable orientation (i.e., to the starting position shown in FIGS. 1 and 2). Concurrently, the cam follower portion 64 of the primary crank member 62 is received in rearwardly directed sliding engagement by the forwardly facing cam surface 75, which causes rotation of the primary crank member 62 in the direction arrow "N" in FIG. 11B. As the moveable track member 40 continues to move rearwardly from its forward track position to its intermediate track position shown in FIGS. 12A and 12B, the cam follower portion 64 of the primary crank member 62 co-operatively contacts the cam surface 72 of the rotatable cam member 76, so as to cause the primary crank member 62 to be held in its actuating configuration until after the moveable track member 40 moves rearwardly past the intermediate track position. As indicated by arrow "O" of FIGS. 12A and 12B, the moveable track member 40 continues to move rearwardly past the intermediate track position shown in FIGS. 12A and 12B, with the cam follower portion 64 of the primary crank member 62 still being held in its actuating configuration by the cam surface 72 on the rotatable cam member 76 interacting with the cam follower portion 64 of the primary crank member 62.

As indicated by arrow "P" in FIGS. 13A and 13B, the moveable track member 40 continues to move rearwardly until it reaches its rearward track position shown in FIGS. 13A and 13B. Once the cam follower portion 64 of the primary crank member 62 is disposed rearwardly of the rotatable cam member 76, it returns to a lower position, as indicated by arrow "Q" of FIGS. 13A and 13B, corresponding to the primary crank member 62 returning to its rest configuration. It can readily be understood from the above description and the drawings that such return of the primary crank member 62 to its rest configuration is permitted to occur only after movement of the movable track member 40 to a position rearward of the intermediate track position has occurred. Once both of the inboard and outboard movable track members 40 of the vehicle seat assembly 30 are in this rearward track position, the vehicle seat assembly 30 can be released from being manually moved to the rearward track position. Such release of the vehicle seat assembly 30 permits both of the inboard and outboard movable track members 40 to be longitudinally aligned one with the other. The inboard and outboard movable track members 40 are then moved forwardly in a laterally even manner, as indicated by arrow "R" in FIGS. 14A and 14B, to their intermediate track positions, by the spring that biases the vehicle seat assembly 30 to its easy entry position. Once returned to the intermediate track position, each track locking means 50 returns to its locking configuration, thus locking both the inboard and outboard movable track members 40 with respect to their respective fixed track members 42. Thus, both track locking means 50 are assured of locking at the single locking position provided for each.

Other modifications and alterations may be used in the design and manufacture of the vehicle seat slide according to the present invention without departing from the spirit and scope of the invention, which is limited only by the accompanying claims.

I claim:

1. A vehicle seat slide for use with a vehicle seat assembly mounted thereon, said vehicle seat slide comprising:

a movable track member slidably engaging a fixed track member for longitudinal sliding movement of said movable track member relative to said fixed track member along a longitudinal axis between a rearward track position, an intermediate track position, and a forward track position;

a track locking means mounted on one of the fixed and movable track members and having one or more detent portions selectively engageable with a corresponding number of slots formed on the other of said fixed and movable track members to respectively receive, in blocking engagement, one each, said one or more detent portions in generally transverse relation to said longitudinal axis, so as to define a locking configuration of said track locking means, at which locking configuration said longitudinal sliding movement of said movable track member relative to said fixed track member is restrained, said track locking means further comprising a biasing means adapted to bias said track locking means toward said locking configuration;

actuator means mounted on said movable track member in operative connection with said track locking means for movement between an actuating configuration whereat said actuator means urges said track locking means away from said locking configuration against the action of said biasing means, and a rest configuration whereat said actuator means permits said track locking means to move toward said locking configuration;

control means operatively mounted on said fixed track member for co-operative contact of said control means and said actuator means so as to cause said actuator means to be held in said actuating configuration upon said movable track member being moved to said forward track position and for thereafter permitting said actuator means to return to said rest configuration only after movement of said movable track member to a position rearward of said intermediate track position.

2. A vehicle seat slide according to claim 1, wherein said track locking means is mounted on said movable track member and said slots are formed on said fixed track member.

3. A vehicle seat slide according to claim 2, wherein said slots are formed in a longitudinally intermediate portion of said fixed track member so as to provide for movement of the track locking means to its locking configuration only at said intermediate track position.

4. A vehicle seat slide according to claim 3, wherein said primary crank member has a cam follower portion projecting from a leading edge thereof in substantially transverse relation to said longitudinal axis and said control means presents a cam surface for contact with said cam follower portion, said cam follower portion and said cam surface together effecting said co-operative contact of said control means and said actuator means.

5. A vehicle seat slide according to claim 4, wherein said control means comprises a base member securely affixed to said fixed track member and a rotatable cam member pivotally mounted on said base member for rotational movement about a second pivot axis substantially parallel to said first pivot axis, said base member and said rotatable cam member presenting said cam surface, so as to provide for said co-operative contact of said actuator means and said control means.

6. A vehicle seat slide according to claim 5, wherein said rotatable cam member is pivotally mounted on said base member for said rotational movement about said second pivot axis between an actuator passing orientation whereat said actuator means is permitted to move from said rest configuration to said actuating configuration when said actuator means is in said intermediate track position, and an actuator bearing orientation whereat, as aforesaid, said actuator means is caused to be held in said actuating configuration upon said movable track member being moved to said forward track position and thereafter permitted to return to said rest configuration only after movement of said movable track member to a position rearward of said intermediate track position.

7. A vehicle seat slide according to claim 6, wherein said actuator passing orientation is a substantially vertical orientation and said actuator bearing orientation is a substantially horizontal orientation.

8. A vehicle seat slide according to claim 7, wherein said rotational movement of said rotatable cam member is permitted in a first rotational direction only, and is precluded in an opposite second rotational direction by a ratchet means.

9. A vehicle seat slide according to claim 8, wherein said rotational movement of said rotatable cam member is precluded in said opposite second rotational direction by said ratchet means only when said rotatable cam member is in said substantially horizontal orientation.

10. A vehicle seat slide according to claim 9, wherein said ratchet means is mounted on said base member.

11. A vehicle seat slide according to claim 10, wherein said ratchet means comprises a laterally projecting stop flange member having a stop surface for precluding said rotatable cam member from pivoting about said second pivot axis in said second rotational direction, and an inclined surface adjacent said stop surface for permitting said rotatable cam member to advance up said inclined surface past said stop surface in said first rotational direction.

12. A vehicle seat slide according to claim 11, wherein said rotatable cam member comprises an elongate arm member pivotally mounted substantially symmetrically about said second pivot axis, with said second pivot axis oriented substantially transversely to said longitudinal axis.

13. A vehicle seat slide according to claim 12, wherein said second pivot axis is substantially horizontally disposed.

14. A vehicle seat slide according to claim 12, wherein said cam follower portion contacts said base member when said actuator means is in said actuating configuration, so as to preclude forward movement of said movable track member from said intermediate track position toward said forward track position.

15. A vehicle seat slide according to claim 14, wherein said rotatable cam member is disposed vertically over said cam follower portion of said primary crank member when said moveable track member is disposed in said intermediate track position and said rotatable cam member is disposed in said actuator bearing orientation.

16. A vehicle seat slide according to claim 15, wherein said base member has a forwardly facing ramp surface leading to said cam surface and disposed to receive said cam follower portion of said primary crank member in rearwardly directed sliding engagement.

17. A vehicle seat slide according to claim 16, wherein said cam follower portion of said primary crank member engages said cam surface of said control means in sliding relation when said movable track member moves rearwardly from said forward track position, through said intermediate track position and to said rearward track position, when said actuator means is in said actuating configuration.

18. A vehicle seat slide according to claim 17, wherein said cam surface presented by said base member and said rotatable cam member is substantially straight.

19. A vehicle seat slide according to claim 18, wherein said cam surface presented by said base member and said rotatable cam member is substantially horizontally disposed.

* * * * *